United States Patent
Somogyi et al.

(10) Patent No.: US 10,127,122 B2
(45) Date of Patent: *Nov. 13, 2018

(54) SYSTEM AND METHOD FOR SUPPORTING TRANSACTION AFFINITY BASED REQUEST HANDLING IN A MIDDLEWARE ENVIRONMENT

(71) Applicant: Oracle International Corporation, Redwood Shores, CA (US)

(72) Inventors: Alexander Somogyi, Basking Ridge, NJ (US); Sindhu Subramanyam, Redwood Shores, CA (US); Stephen Felts, Rockaway, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,135

(22) Filed: Nov. 8, 2016

(65) Prior Publication Data
US 2017/0052855 A1   Feb. 23, 2017

Related U.S. Application Data

(63) Continuation of application No. 14/520,175, filed on Oct. 21, 2014, now Pat. No. 9,519,509.

(51) Int. Cl.
*G06F 9/44* (2018.01)
*G06F 9/445* (2018.01)
(Continued)

(52) U.S. Cl.
CPC ............ *G06F 11/2007* (2013.01); *G06F 8/20* (2013.01); *G06F 8/71* (2013.01); *G06F 9/466* (2013.01);
(Continued)

(58) Field of Classification Search
CPC .. G06F 8/20; G06F 8/71; G06Q 10/06; G06Q 10/10
See application file for complete search history.

(56) References Cited

U.S. PATENT DOCUMENTS

| 6,424,992 B2 | 7/2002 | Devarakonda |
| 7,406,692 B2 | 7/2008 | Halpern |

(Continued)

OTHER PUBLICATIONS

Oracle, "Oracle Fusion Middleware", Oracle, Jun. 2017, pp. 1-246; <https://docs.oracle.com/middleware/1213/wls/CLUST/CLUST.pdf>(Year: 2017).*

(Continued)

*Primary Examiner* — Thuy Dao
*Assistant Examiner* — Ben C Wang
(74) *Attorney, Agent, or Firm* — Tucker Ellis LLP

(57) ABSTRACT

A system and method can support transaction processing in a middleware environment. A processor, such as a remote method invocation stub in the middleware environment, can be associated with a transaction, wherein the transaction is from a first cluster. Then, the processor can handle a transactional request that is associated with the transaction, wherein the transactional request is to be sent to the first cluster. Furthermore, the processor can route the transactional request to a said cluster member in the first cluster, which is an existing participant of the transaction.

20 Claims, 3 Drawing Sheets

(51) Int. Cl.
   G06F 11/20    (2006.01)
   G06F 9/46     (2006.01)
   G06F 9/50     (2006.01)
   G06F 8/20     (2018.01)
   G06F 8/71     (2018.01)
   H04L 29/08    (2006.01)
   G06Q 10/06    (2012.01)
   G06Q 10/10    (2012.01)

(52) U.S. Cl.
   CPC .......... *G06F 9/5027* (2013.01); *G06F 9/5033* (2013.01); *H04L 67/34* (2013.01); *G06F 2201/85* (2013.01); *G06Q 10/06* (2013.01); *G06Q 10/10* (2013.01)

(56) References Cited

U.S. PATENT DOCUMENTS

| | | | |
|---|---|---|---|
| 8,275,889 B2 | 9/2012 | Colasurdo | |
| 8,635,185 B2 | 1/2014 | Somogyi | |
| 9,325,768 B2* | 4/2016 | Liu | H04L 67/00 |
| 9,519,509 B2 | 12/2016 | Somogyi | |
| 2006/0053380 A1 | 3/2006 | Spataro | G06F 17/30011 |
| | | | 715/753 |
| 2006/0085549 A1* | 4/2006 | Hasti | H04L 67/1034 |
| | | | 709/227 |
| 2007/0185997 A1* | 8/2007 | Stecher | H04L 67/28 |
| | | | 709/226 |
| 2007/0240140 A1* | 10/2007 | Degenaro | G06F 9/5066 |
| | | | 717/158 |
| 2008/0091779 A1 | 4/2008 | Chetuparambil | |
| 2008/0183782 A1* | 7/2008 | Andreev | G06Q 10/06 |
| | | | 708/200 |
| 2009/0034537 A1 | 2/2009 | Colrain | |
| 2009/0100289 A1 | 4/2009 | Chen | |
| 2009/0296711 A1 | 12/2009 | Kennedy | |
| 2009/0300116 A1* | 12/2009 | Ramarao | G06Q 10/10 |
| | | | 709/206 |
| 2010/0153444 A1* | 6/2010 | Nayak | G06Q 10/10 |
| | | | 707/770 |
| 2010/0153565 A1* | 6/2010 | Nayak | G06Q 10/06 |
| | | | 709/229 |
| 2011/0252127 A1 | 10/2011 | Iyengar | |
| 2012/0239818 A1* | 9/2012 | Defayet | H04L 67/14 |
| | | | 709/228 |
| 2013/0063544 A1* | 3/2013 | Kanniappan | H04N 7/15 |
| | | | 348/14.07 |
| 2013/0254782 A1 | 9/2013 | Shen | |
| 2013/0290524 A1 | 10/2013 | Liu | |
| 2013/0318221 A1 | 11/2013 | Anaya | |
| 2013/0346607 A1* | 12/2013 | Fu | G06F 8/71 |
| | | | 709/225 |
| 2014/0325481 A1* | 10/2014 | Pillai | G06F 11/3409 |
| | | | 717/124 |
| 2015/0088982 A1* | 3/2015 | Johnson | H04L 67/34 |
| | | | 709/203 |
| 2015/0309834 A1 | 10/2015 | Shen | |
| 2015/0309835 A1* | 10/2015 | Shen | G06F 9/466 |
| | | | 718/101 |
| 2015/0309837 A1* | 10/2015 | Shen | G06F 9/466 |
| | | | 718/101 |
| 2016/0087933 A1 | 3/2016 | Johnson | |
| 2016/0092254 A1* | 3/2016 | Borra | G06F 9/45558 |
| | | | 718/1 |
| 2016/0110188 A1* | 4/2016 | Verde | G06F 11/2007 |
| | | | 709/227 |
| 2016/0110216 A1* | 4/2016 | Somogyi | G06F 8/20 |
| | | | 718/101 |
| 2017/0153910 A1* | 6/2017 | Shen | G06F 9/466 |

OTHER PUBLICATIONS

Narayana et al., "Distributed Wide-Area Traffic Management for Cloud Services", ACM, Jun. 2012, SIGMETRICS '12, pp. 409-410; <https://dl.acm.org/citation.cfm?id=2254817> (Year: 2012).*

Xu et al., "Energy Efficiency of Cloud Virtual Machines: From Traffic Pattern and CPU Affinity Perspectives", IEEE, Jun. 2015, pp. 835-845; <https://ieeexplore.ieee.org/stamp/stamp.jsp?tp=&arnumber=7134723> (Year: 2015).*

Oracle, Oracle® Fusion Middleware, Programming Advanced Features of JAX-WS Web Services for Oracle WebLogic Server, 11g Release 1 (10.3.4), Jan. 2011, 256 pages.

Kaushik Dutta et al., "ReDAL: An Efficient and Practical Request Distribution Technique for Application Server Clusters", IEEE Transactions on Parallel and Distributed Systems, vol. 18, No. 11, Nov. 2007, 13 pages.

Matt Elder et al., "Abstract Domains of Affine Relations", ACM Transactions on Programming Languages and Systems, vol. 36, No. 4, Article 11, Oct. 2014, 73 Pages.

Kyungoh Ohn et al., "Dynamic Affinity Cluster Allocation in a Shared Disks Cluster", The Journal of Supercomputing, 37, 47-69, 2006.

* cited by examiner

US 10,127,122 B2

SYSTEM AND METHOD FOR SUPPORTING TRANSACTION AFFINITY BASED REQUEST HANDLING IN A MIDDLEWARE ENVIRONMENT

CLAIM PRIORITY

This application is a continuation of U.S. patent application Ser. No. 14/520,175, filed Oct. 21, 2014 entitled "SYSTEM AND METHOD FOR SUPPORTING TRANSACTION AFFINITY BASED REQUEST HANDLING IN A MIDDLEWARE ENVIRONMENT" which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to transaction processing in a middleware environment.

BACKGROUND

The enterprise application servers can process various transactions within an organization, such as by taking advantage of the distributed object computing, which allows various applications to operate over multiple machines and/or virtual machines (VMs). With the developments in new technologies such as high performance network and multi-processor computers, there is a need to further improve the performance. This is the general area that embodiments of the invention are intended to address.

SUMMARY

Described herein are systems and methods that can support transaction processing in a middleware environment. A processor, such as a remote method invocation stub in the middleware environment, can be associated with a transaction, wherein the transaction is from a first cluster. Then, the processor can handle a transactional request that is associated with the transaction, wherein the transactional request is to be sent to the first cluster. Furthermore, the processor can route the transactional request to a said cluster member in the first cluster, which is an existing participant of the transaction.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the WebLogic server (WLS) environment as an example for a middleware environment. It will be apparent to those skilled in the art that other types of middleware environment can be used without limitation.

Described herein are systems and methods that can support transaction processing in a middleware environment.

Transaction Affinity Based Request Handling

A transaction can be a distributed (XA) transaction, or a local transaction. The XA transaction can update multiple resource managers (such as databases) in a coordinated manner. In contrast, a local transaction begins and commits the transaction to a single resource manager.

Furthermore, a global transaction is a mechanism that allows a set of programming tasks, potentially using more than one resource manager and potentially executing on multiple servers, to be treated as one logical unit.

In accordance with an embodiment of the invention, the system can route various requests in a global transaction based on the transaction affinity. For example, the XA transaction affinity allows server instances that are participating in a global transaction to service related requests rather than load-balancing these requests to other member servers. The XA Transaction Affinity allows the transaction to always land on the server where the transaction started in the cluster, subsequent requests made in the context of that transaction are also handled on the same server rather than load-balancing requests to other servers in the cluster that have the same resources configured.

Figure 1:
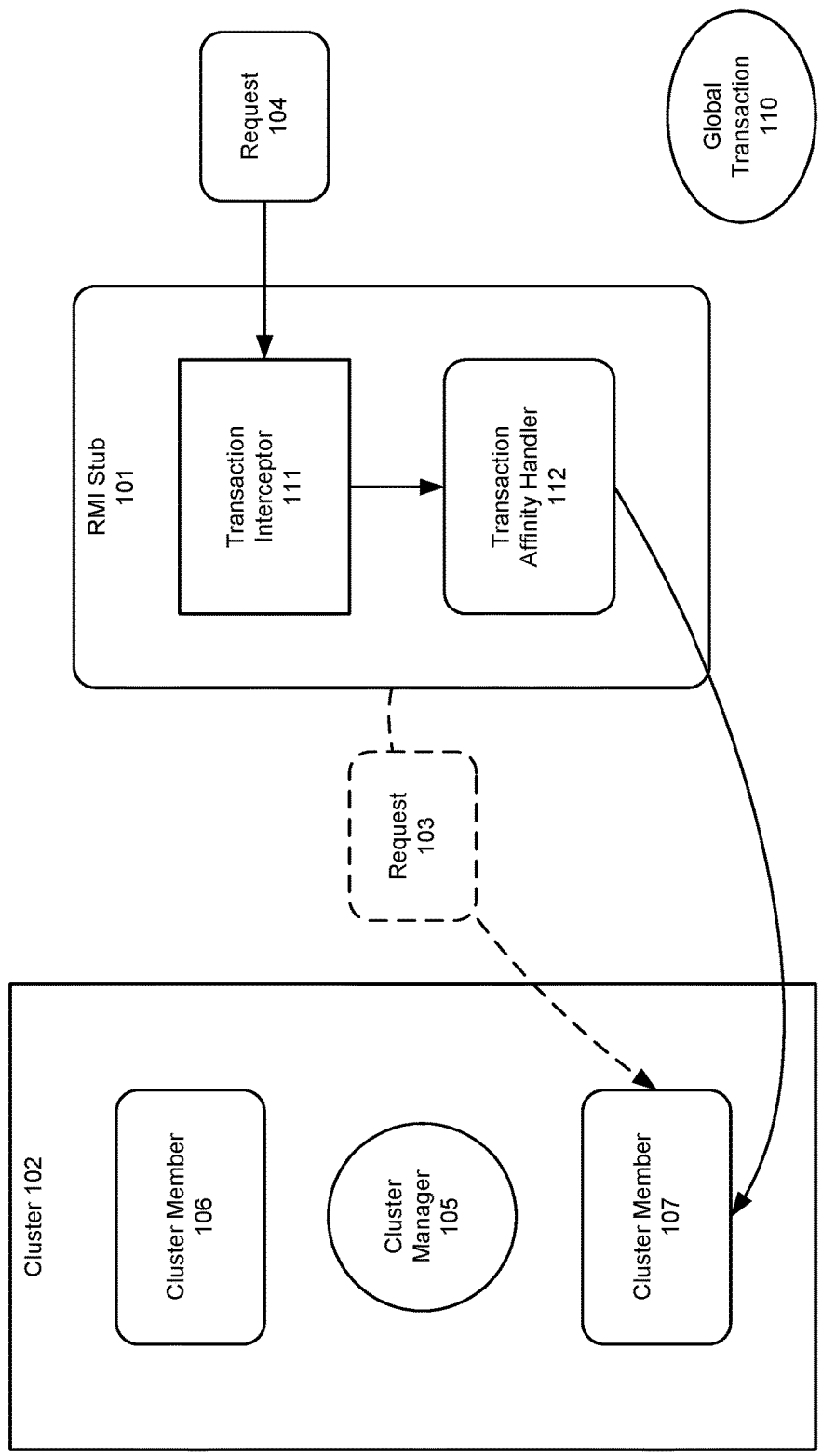
FIG. 1 shows an illustration of supporting transaction affinity based request handling in a middleware environment, in accordance with an embodiment of the invention.

FIG. 1 shows an illustration of supporting transaction affinity based request handling in a middleware environment, in accordance with an embodiment of the invention. As shown in FIG. 1, a processor, such as a clustered remote method invocation (RMI) stub 101 in a middleware environment 100, can handle various transactional requests (e.g. requests 103-104) that are involved in a transaction, e.g. a global transaction 110.

The transactional requests 103-104 may target a remote cluster 102, which can include a plurality of cluster members 106-107 (e.g. application servers on host machines). The RMI stub 101 can be used to invoke a remote method provided by an application running on a cluster member 106-107 in the remote cluster 102.

As shown in FIG. 1, the request 103 may be the first request, which is involved in the transaction 110 and targets the remote cluster 102. For example, the RMI stub 101 can route the request 103 to a cluster member 107 in the remote cluster 102, based on a load-balancing algorithm (e.g. a round robin algorithm), since no cluster member in the remote cluster 102 is an existing participant of the transaction 110.

Then, the RMI stub 101 can handle a subsequent request 104, which also targets the cluster 102. The RMI stub 101 can take advantage of a transaction interceptor 111, which can intercept the request 104 that targets the cluster 102. Furthermore, the RMI stub 101 can use a handler, such as a transaction affinity handler 112, to handle the transactional affinity based request routing.

Instead of load-balancing the request 104 to other cluster members (e.g. the cluster member 106), the transaction affinity handler 112 associated with the clustered RMI stub 101 can route the request 104 to the cluster member 107, which is a host in the set of servers servicing the global transaction 110, since the cluster member 107 is an existing participant of the transaction 110 in the remote cluster 102.

Thus, by selecting a server that is already a participant of the transaction, the system can reduce the possibility that the global transaction 110 may span over multiple cluster members in the remote cluster 102.

The following List 1 shows an exemplary application programming interface (API) for a transaction interceptor 111.

List 1

```
/**
* @param id - ID for a host, the participation of which in the transaction
needs to be checked.
* @return true if the server is a participant in the global transaction,
false otherwise
*/
boolean isParticipant(HostID id);
/*
* @return true if there is an active transaction in play, false otherwise
*/
boolean needsInterception( );
```

The following List 2 shows illustration of an API for an exemplary transaction affinity handler 112.

List 2

```
/**
* @param currentRef        the current reference
* @param method            method being called
* @param parameters        method parameters
* @param txnAffinityHandler
*                          handler to intercept transaction affinity
                           based requests, can be null
* @param md                method descriptor associated
                           with the method
* @returns                 the new reference to use
*/
RemoteReference loadBalance(
    RemoteReference currentRef,
    Method method,
    Object parameters[ ],
    TransactionalAffinityHandler txnAffinityHandler,
    RuntimeMethodDescriptor md);
```

As shown in the above, the system can call the loadBalance( ) method to choose a remote reference for handling a request (before invoking a remote method). Furthermore, an implementation of the loadBalance( ) method may return a reference to a server that is currently in use for continuing its usage, or return a new reference to a different server for load-balancing.

In accordance with an embodiment of the invention, a cluster manager 105 can be used for configuring the cluster 102 to support the transaction affinity based request handling. For example, the ClusterMBean for a WLS cluster can include an attribute (e.g. TxnAffinityEnabled), which indicates that the transaction affinity based request handling is required in the WLS cluster.

The following List 3 shows an exemplary application programming interface (API) for configuring a ClusterMBean.

List 3

```
/**
* @default false
* @dynamic false
* @return true if transaction affinity is required, false otherwise
*/
boolean getTxnAffinityEnabled( );
/**
* @default false
* @dynamic false
*/
void setTxnAffinityEnabled(boolean txAffinity);
```

In WLS, the system can enable the transaction affinity by configuring the TxnAffinityEnabled property in the ClusterMBean (which function as a cluster manager 105). Furthermore, once the TxnAffinityEnabled property is configured, the transaction affinity may apply to the applications that have transactional methods deployed in the cluster 102.

Subsequently, when a method that is marked as transactional is invoked as part of the global transaction 110, the TransactionInterceptor can intercept the request and the TransactionalAffinityHandler can be used for performing the transactional affinity based request routing. Thus, the system can choose a WLS server, which is an existing participant of a global transaction 110, for handling the clustered requests.

In accordance with an embodiment of the invention, the system can provide better overall throughput by reducing inter-server transaction coordination traffic, improving resource utilization (such as the number of the JDBC connections), and simplifying asynchronous processing of transactions (such as avoiding timing issues related to asynchronous processing of transaction afterCompletion callbacks).

In accordance with an embodiment of the invention, the transaction affinity based request handling in the cluster 102 can take precedence over other approaches, such as the load-balancing options. On the other hand, if the cluster 102 does not have a cluster member already participating in the transaction, the RMI stub 101 can load-balance the request 104 to an available cluster member 106.

For example, in WLS, a set of load-balancing algorithms can be configured on the ClusterMBean. The set of load-balancing algorithms may include various options, such as "round-robin", "weight-based", "random", "round-robin-affinity", "weight-based-affinity", and "random-affinity."

Additionally, a user can control the request routing in the middleware environment 100, e.g. by defining a customized call router that can return a name of a server that a request should be routed to.

In accordance with an embodiment of the invention, if there is no host that matches the criteria (based on the transaction affinity), then the request 104 can be failed over to the next host available in the replica list. Also, if the selected cluster member 107 fails, the system may be able to perform necessary transaction recovery tasks, e.g. relying on the Java transaction API (JTA) transaction recovery service.

In accordance with an embodiment of the invention, the transactional affinity based request routing can be used for handling the in-doubt transactions (e.g. working with the no XA transaction log (TLog) feature in WLS). Furthermore, the transactional affinity based request routing can be significantly advantageous when the in-doubt transactions span over multiple application servers/clusters.

Figure 2:
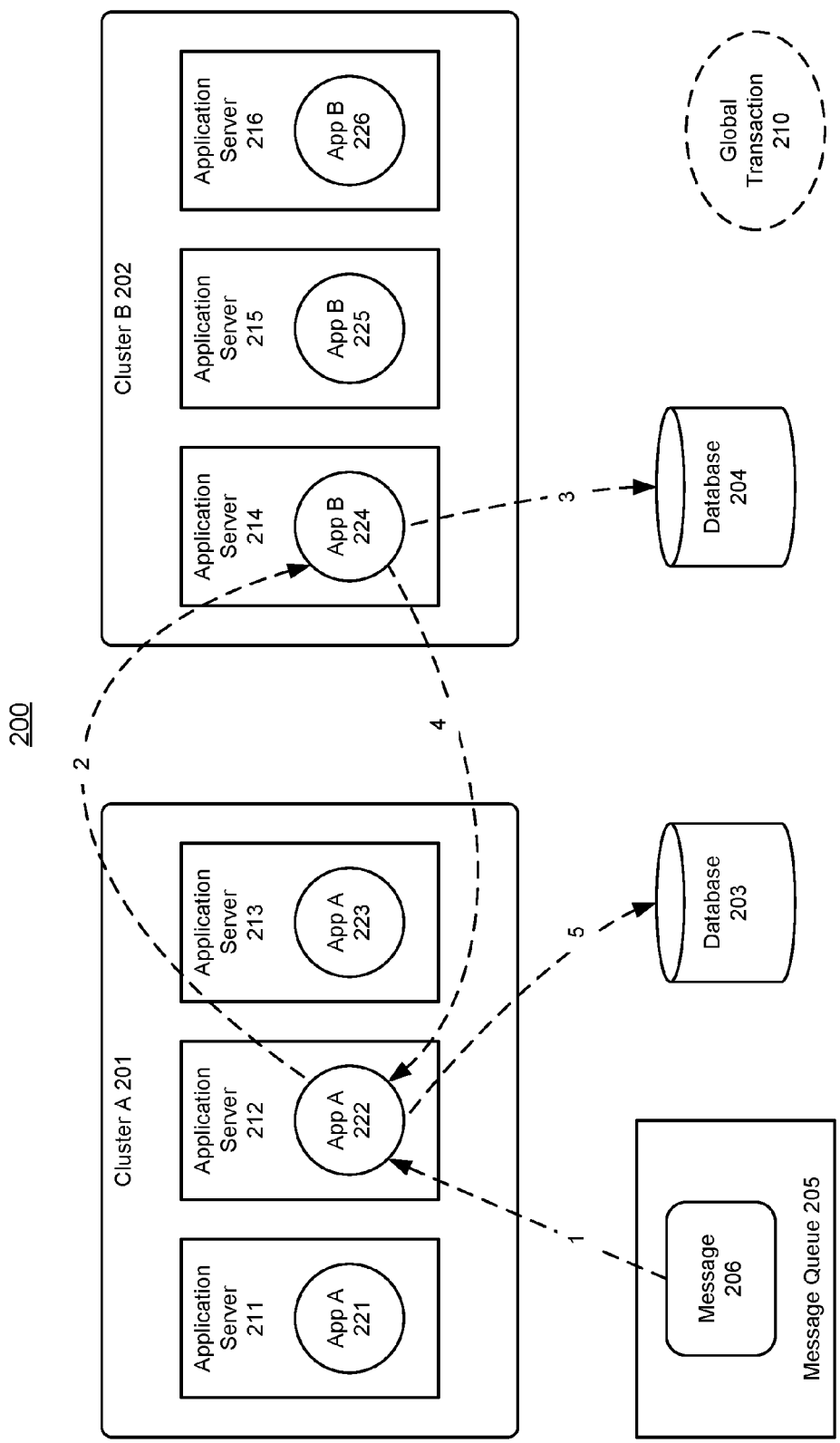
FIG. 2 shows an illustration of supporting a global transaction in a middleware environment, in accordance with an embodiment of the invention.

FIG. 2 shows an illustration of supporting a global transaction in a middleware environment, in accordance with an embodiment of the invention. As shown in FIG. 2, the middleware environment 200 can include a plurality of clusters, e.g. the cluster A 201, which includes various cluster members such as the application servers 211-213, and the cluster B 202, which includes various cluster members such as the application servers 214-216.

Furthermore, a transaction, such as a global transaction 210, can involve multiple applications in the middleware environment 200. For example, the global transaction 210 involves an application A in the cluster A 201 and an application B in the cluster B 202.

Additionally, multiple copies of the same application can be deployed within a cluster for servicing the different requests in the middleware environment 200. For example, each of the application servers 211-213 can be deployed with a copy of the application A (i.e. APP A 221-223). Also, each of the application servers 214-216 can be deployed with a copy of the application B (i.e. APP B 224-226).

At step 1, the APP A 222, which is running on an application server 212 in the cluster A 201, can dequeue a message 206 from a Java message service (JMS) queue 205 and initiates the global transaction 210.

At step 2, the APP A 222 can call the APP B 224, which is running on the application server 214 in the cluster B 202. The application server 214 can function as a sub-coordinator in the cluster B 202 for the transaction 210, since the transaction 210 is propagated to the cluster B 202.

At step 3, the APP B 224 can update the records in the database 204. Then, at step 4, the transaction 210 can be propagated back to the cluster A 201. With the transaction cluster affinity feature enabled, the system may force the transactional request to land on the application server 212, which is coordinating the transaction, instead of performing load-balancing, which may land the transactional request on a different server (e.g. the application server 211 or the application server 213).

Finally, at step 5, APP A 222 can update the database 203, before committing the transaction 210.

In accordance with an embodiment of the invention, there is a performance advantage by eliminating the overhead of coordinating resources and sub-coordinators across multiple server instances in a cluster.

As shown in FIG. 2, there can be at most one application server, which functions as the participant in a global transaction 210, per cluster.

Furthermore, as the number of the inter-cluster RMI invocations increases, there may be a large number of application servers participating in the transaction 210 (without taking advantage of the transaction affinity based request handling). By using the transaction affinity based request handling, the system can limit the number of server participants to one application server in each cluster.

Thus, the transaction manager (TM), e.g. on the application server 212, can have less sub-coordinators (such as the WLS servers) and resources to manage.

In accordance with an embodiment of the invention, the transaction affinity based request handling can be used for supporting performing two phase commit calls in a global transaction.

The two-phase commit protocol for processing a XA transaction is a method of coordinating a single transaction across two or more resource managers. It guarantees data integrity by ensuring that transactional updates are committed in all of the participating databases, or are fully rolled back out of all the databases, reverting to the state prior to the start of the transaction. In other words, either all the participating databases are updated, or none are updated.

In accordance with an embodiment of the invention, the system can take advantage of both the transaction affinity optimization and the database instance affinity optimization.

Using the database instance affinity optimization, such as the GridLink XA affinity in WLS, the database instance information can be stored in middle-tier transaction context. The system can limit database communication from one or more application server instances to a single database cluster instance. Thus, the database instance affinity optimization can achieve performance gains by reducing database intra-cluster communication for a given database transaction branch of a global transaction.

In contrast, the transaction affinity optimization, such as the WLS cluster XA affinity, requires no additional affinity context, since RMI request routing can be performed using existing transaction participant information. The transaction affinity optimization may operate solely in the middle-tier, e.g. within a single domain or across domains. Thus, the system can achieve performance gains by reducing global transaction server participants, thereby reducing middle-tier inter-server communication for JTA two-phase commit processing.

Figure 3:
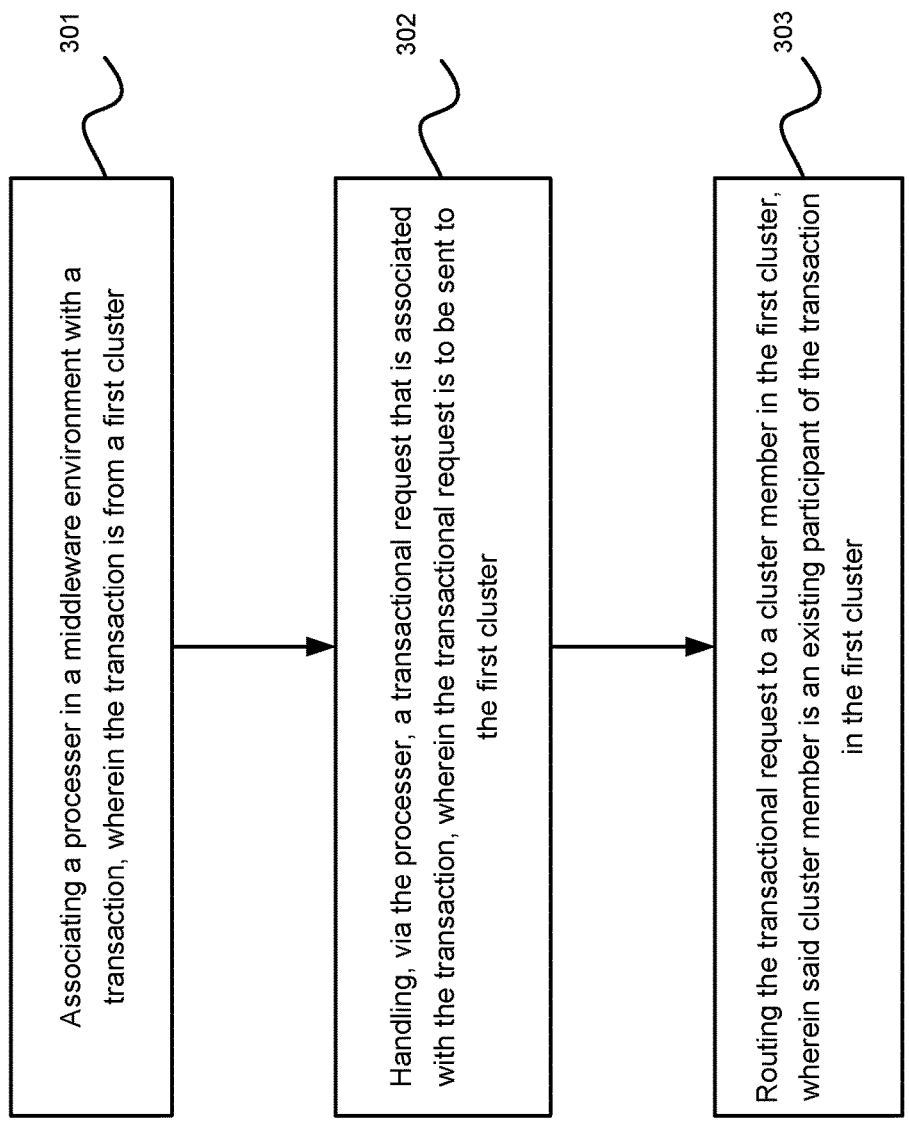
FIG. 3 illustrates an exemplary flow chart for supporting transaction affinity based request handling in a middleware environment, in accordance with an embodiment of the invention.

FIG. 3 illustrates an exemplary flow chart for supporting transaction affinity based request handling in a middleware environment, in accordance with an embodiment of the invention. As shown in FIG. 3, at step 301, a processor, such as a remote method invocation stub in the middleware environment, can be associated with a transaction, wherein the transaction is from a first cluster. Then, at step 302, a processor can handle a transactional request that is associated with the transaction, wherein the transactional request is to be sent to the first cluster. Furthermore, at step 303, the processor can route the transactional request to a cluster member in the first cluster, wherein said cluster member is an existing participant of the transaction in the first cluster.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting transaction processing in a computing cluster including a plurality of application servers, the method comprising:
   initiating a first global transaction from an application running on a host server external to the cluster by transmitting a first RMI request from the host server to said cluster;
   receiving at said cluster the first remote method invocation (RMI) request associated with the first global transaction;
   determining that no RMI request associated with said first global transaction has been previously received by said cluster;
   selecting a first application server of said plurality of application servers for processing said first RMI request;
   routing said first RMI request to said first application server for processing;
   processing on the first application server, a first method invoked by the first RMI request associated with the first global transaction;
   receiving at said cluster a second RMI request;
   determining whether the second RMI request is associated with the first global transaction; and
   selecting the first application server for processing said second RMI request if the second RMI request is associated with the first global transaction, and using a load balancing method for selecting a second application server of said plurality of application servers for processing said second RMI request if the second RMI request is associated with a second global transaction.

2. The method of claim 1, further comprising:
   selecting the first application server for processing all subsequent RMI requests associated with the first global transaction received at said cluster.

3. The method of claim 1, wherein the second RMI request is associated with the second global transaction, the method further comprising:
   selecting the second application server for processing all subsequent RMI requests associated with the second global transaction received at said cluster.

4. The method of claim 1, further comprising:
   providing an indicator of transaction affinity routing in said first RMI request sent from said host server to said cluster.

5. The method of claim 1, further comprising:
   committing the first global transaction using a two-phase commit protocol.

6. The method of claim 1, further comprising:
   providing an interceptor in said cluster for intercepting RMI requests; and
   using a handler in said cluster to select application servers for processing said RMI requests and routing said RMI requests to application servers selected.

7. The method of claim 1, further comprising:
   using a cluster manager to configure the cluster, to require transaction affinity based request handling.

8. The method of claim 1, further comprising:
   performing a failover operation to select another application server of the plurality of application servers, if the first application server is not available for processing a subsequent RMI request associated with the first global transaction.

9. The method of claim 1, wherein the load-balancing method comprises a round robin load balancing method for selecting an application server of the plurality of application servers.

10. The method of claim 1, further comprising:
    allowing a user to specify an application server in the first cluster to handle a particular RMI request.

11. A system for supporting transaction processing comprising:
    a computing cluster including a plurality of application servers, each application server comprising one or more microprocessors;
    an application running on a host server external to the cluster which initiates a first global transaction and transmits a first RMI request from the host server in the cluster;
    an interceptor and a handler running on said plurality of application servers in said cluster;
    wherein said interceptor and handler are configured to perform steps comprising:
        intercepting the first remote method invocation (RMI) request associated with the first global transaction received at said cluster;
        determining that no RMI request associated with said first global transaction has been previously received by said cluster;
        selecting a first application server of said plurality of application servers for processing said first RMI request;
        routing said first RMI request to said first application server for processing;
        intercepting a second RMI request received at the cluster;
        determining whether the second RMI request is associated with the first global transaction; and
        selecting the first application server for processing said second RMI request if the second RMI request is associated with the first global transaction, and using a load balancing method for selecting a second application server of said plurality of application servers for processing said second RMI request if the second RMI request is associated with a second global transaction.

12. The system according to claim 11, wherein:
    the interceptor and handler are further configured to select the first application server for processing all subsequent RMI requests associated with the first global transaction received at said cluster.

13. The system of claim 11, wherein:
    the interceptor and handler are configured select the second application server for processing all subsequent RMI requests associated with the second global transaction received at said cluster when the second RMI request is associated with the second global transaction.

14. The system of claim 11, wherein:
    said application running on the host server includes an indicator for transaction affinity routing in said first RMI request.

15. The system of claim 11, wherein:
    said application running on the host server is configured to commit the first global transaction using a two-phase commit protocol.

16. The system of claim 11, wherein:
the interceptor and handler are configured to allow a user to specify an application server in the first cluster to handle a particular RMI request.

17. The system of claim 11, further comprising:
a cluster manager adapted to configure the first cluster to require transaction affinity based request handling.

18. The system of claim 11, wherein:
the interceptor and handler are further configured to perform a failover operation to select another application server of the plurality of application servers, if the first application server is not available for processing a subsequent RMI request associated with the first global transaction.

19. The system of claim 11, wherein:
the load-balancing method comprises a round robin load balancing method for selecting an application server of the plurality of application servers.

20. A non-transitory machine readable storage medium having instructions stored thereon for supporting transaction processing in a computing cluster including a plurality of application servers, which instructions, when executed, cause said cluster to perform steps comprising:
initiating a first global transaction from an application running on a host server external to the cluster by transmitting a first RMI request from the host server to said cluster;
receiving at said cluster the first remote method invocation (RMI) request associated with the first global transaction;
determining that no RMI request associated with said first global transaction has been previously received by said cluster;
selecting a first application server of said plurality of application servers for processing said first RMI request;
routing said first RMI request to said first application server for processing;
processing on the first application server, a first method invoked by the first RMI request associated with the first global transaction;
receiving at said cluster a second RMI request;
determining whether the second RMI request is associated with the first global transaction; and
selecting the first application server for processing said second RMI request if the second RMI request is associated with the first global transaction, and
using a load balancing method for selecting a second application server of said plurality of application servers for processing said second RMI request if the second RMI request is associated with a second global transaction.

* * * * *